United States Patent [19]
Koski et al.

[11] Patent Number: 5,997,734
[45] Date of Patent: Dec. 7, 1999

[54] FLOW TOTALIZATION, RESET, AND RESTRICTION MECHANISM FOR USE IN INDICATING THE END OF A TREATMENT CARTRIDGE USEFUL LIFE

[75] Inventors: Kraig J. Koski, Longmont; Brian D. Hunter; Jeffrey K. Aldred, both of Boulder, all of Colo.

[73] Assignee: American Standard, Inc., Piscataway, N.J.

[21] Appl. No.: 09/008,616

[22] Filed: Jan. 16, 1998

[51] Int. Cl.⁶ ........................ B01D 17/12; B01D 35/143

[52] U.S. Cl. ........................ 210/87; 73/861.88; 210/94; 210/100; 222/16; 222/36

[58] Field of Search .................. 210/87, 88, 89, 210/94, 95, 100, 282; 222/22, 36, 14, 16, 17, 20; 73/861.79, 861.87, 861.88

[56] References Cited

U.S. PATENT DOCUMENTS

| | | | |
|---|---|---|---|
| 4,681,677 | 7/1987 | Kuh et al. | 210/94 |
| 4,769,135 | 9/1988 | Norton | 210/100 |
| 5,050,772 | 9/1991 | Brane et al. | 210/100 |
| 5,065,901 | 11/1991 | Brane et al. | |
| 5,525,214 | 6/1996 | Hembree | 210/100 |
| 5,527,451 | 6/1996 | Hemibree et al. | 210/88 |
| 5,622,618 | 4/1997 | Brane et al. | 210/100 |

*Primary Examiner*—Joseph W. Drodge
*Attorney, Agent, or Firm*—Duft, Graziano & Forest P.C.

[57] ABSTRACT

A faucet mounted water filtration device (100) includes an end of life indicator assembly (130) having a flow totalization mechanism (600), a reset mechanism (602) and a flow restriction mechanism (604) coaxially aligned with an indicator assembly (130). A torsion spring (634) and compression spring (644) cooperate for automatic disengagement and resetting of the flow totalization mechanism and the flow restriction mechanism. A planetary gear reduction system 606 provides a 3,000,000:1 gear reduction in the flow totalization mechanism.

10 Claims, 6 Drawing Sheets

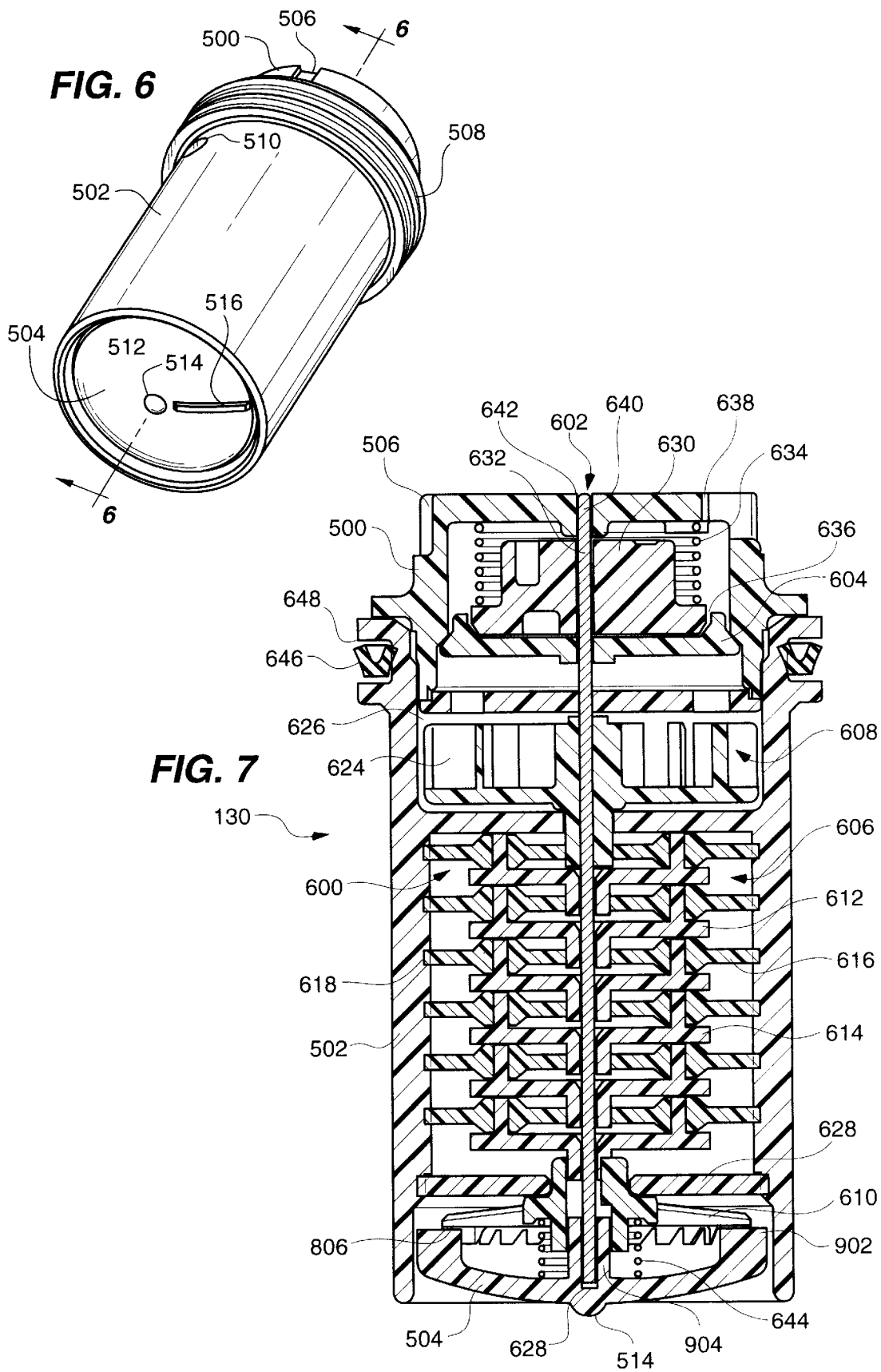

5,997,734

FLOW TOTALIZATION, RESET, AND RESTRICTION MECHANISM FOR USE IN INDICATING THE END OF A TREATMENT CARTRIDGE USEFUL LIFE

SUMMARY OF THE INVENTION

The present invention pertains to method and apparatus for treating water with cartridges containing filtration, purification, or flavoring materials. More particularly, the cartridges have a finite life because they contain a finite amount of treatment material that must be renewed to continue the treatment effect. Accordingly, a flow totalization mechanism is coupled with a flow restriction mechanism to indicate when the treatment cartridge has reached the end of its design life.

PROBLEM

Faucet mounted home water treatment devices are well known in the art. A typical device includes a housing having an inlet and an outlet. A treatment cartridge is placed in an internal flow pathway that connects the inlet with the outlet. The inlet is threadably coupled with the terminal end or outlet of a conventional water faucet. Alternatively, the device may be placed in-line at an upstream location relative to the water faucet. Line pressure causes water to flow through the treatment cartridge. The treatment cartridges must be replaced from time to time because they contain treatment materials that are only useful for treating a finite volume of water. Thus, it is not uncommon for a manufacturer to provide a warning that a particular activated carbon filter should be used to treat only a certain number of gallons of water, e.g., 90 gallons. This circumstance is very frustrating to the consumer who is unable to totalize the cumulative volume of water that passes through the cartridge. As a practical matter, this totalization is seldom, if ever, performed unless a mechanical metering system is built into the filtration device.

U.S. Pat. No. 5,065,901 to Brane et al teaches an in-line filtration system including a totalization mechanism and a valve that shuts off water flow at a predetermined totalization volume. The shutoff and totalization mechanism includes a cam that must be reset by hand. The shutoff occurs rapidly and without warning because there is no visual indicator of remaining filter life. Thus, a user may suddenly find that no more water is available, which circumstance is extremely inconvenient if water is needed for sundry household tasks, such as finishing the preparation of dinner, the removal of soap from hair, bathing a baby, and so forth. A situation soon arises where all sundry household duties must become subservient to the overriding objective of restoring the flow of water. This situation is unacceptable to many persons because the filtration of household water is a personal and nonessential choice. Most persons would in no way be harmed by continuing their normal uses of water using unfiltered water for short periods of time.

An additional problem with the '901 patent design is that the totalization mechanism includes a plurality of stacked offset gears that are subject to jamming and misalignment. The flow shut-off mechanism, accordingly, may never engage at the intended filter end of life volume because the totalization mechanism is jammed or inaccurate.

U.S. Pat. No. 5,527,451 to Hembree et al teaches a similar system to that of Brane et al, except the '451 patent is mounted on the terminal end of a water faucet. Automatic shut-off indicates that the cartridge has reached the end of its useful life. The user is disadvantageously surprised; however, the '451 patent also teaches the use of a bypass valve that can be used to circumvent the shut-off filtration cartridge. The bypass water emerges from the filter in a raw, unfiltered state.

The problem with the '451 bypass valve is that the filtration cartridge inside the device is still useful for filtering water. The engineering design of filtration cartridges builds in a safety factor, e.g., a cartridge that is designed to filter 200 gallons at most, may be marketed as one that filters only 150 gallons. Furthermore, the effectiveness of many treating materials, e.g., activated carbon, does not stop abruptly, but decreases gradually. Thus, the 200 gallon cartridge has some utility even after filtering 200 gallons. The absolute shut-off and bypass of the '451 design is disadvantageous because it removes the option of continuing filtration of water for a short period of time after the predetermined cartridge end of life.

A publication by a certification agency, NSF 53-1994 by the National Safety Foundation, indicates that faucet-mounted water filtration devices may be built with or without flow totalization mechanisms. Filtration cartridges for those systems having no totalization system must have a 100% safety factor with respect to the indicated cartridge useful life and the amount of filtration material in the cartridge. Filtration cartridges for systems having a totalization mechanism still must have a 100% safety factor unless the devices provide a shut-off or flow reduction showing the end of cartridge life. No mention is made of how flow reduction might be accomplished or why it is needed in place of a complete shut-off.

SOLUTION

The present invention overcomes the problems outlined above by providing a faucet-mounted water treatment device having totalization, flow reduction, and automatic reset mechanisms. The water treatment device advantageously permits users to continue use of filtered water past the time when the treatment cartridge has treated a predetermined quantity of water corresponding to the design limit for the cartridge useful life.

A water treatment device according to the invention includes a totalization mechanism and a flow restriction mechanism. The totalization mechanism works to quantify the cumulative flow of water through a treatment cartridge in the device. The flow restriction mechanism for restricts the flow of water once the totalization mechanism indicates that the cumulative flow of water has met or exceeded a predetermined amount of water corresponding to the cartridge design life. The amount of flow under conditions of restricted flow ranges from five to fifty percent of the unrestricted flow rate and, more preferably ranges from ten to forty percent.

In preferred embodiments, the water treatment device includes a reset mechanism that resets the totalization and restriction mechanisms responsive to replacement of the treatment cartridge. This reset mechanism includes an indicator face that abuts a transparent window on the treatment cartridge. The window holds teeth on the indicator face in mating engagement with a ratchet mechanism that is connected to the totalization mechanism. A compression spring biases the indicator face into the transparent window, and disconnects the indicator face teeth from the ratchet when the indicator face is removed from contact with the window on the filtration cartridge. A torsion spring turns the indicator face and restriction mechanism for reset to zero after the indicator face teeth disconnect from the ratchet mechanism.

The totalization mechanism is preferably a planetary gear reduction system having a gear reduction ratio of at least 3,000,000:1. A paddlewheel driven by incoming water is preferably used as the primary mover for the totalization mechanism. At the end of cartridge life, a rotatable disk connected to the totalization mechanism rotates to choke back the flow of water by reducing the flow path area around the outer circumference of the rotatable disk. The treatment cartridge may still be used to filter water until the user finds time to replace the treatment cartridge. The totalization and flow restriction mechanisms automatically reset themselves responsive to removal of the treatment cartridge.

The first step in using the water treatment device is to attach the device to a water faucet. The faucet is used to flow water through the treatment cartridge. The totalization mechanism cumulates the flow of water through the cartridge. The user is provided with an indicator face showing how much water has been treated and how much useful life remains in the treatment cartridge. The restriction mechanism reduces the flow of water at the end of the cartridge design life.

Those skilled in the art will see these and other objects and advantages upon reading the description below together with the accompanying drawings.

BRIEF DESCRIPTION OF THE DRAWINGS

FIG. 6 depicts a top right front elevational perspective view of an end of life indicator assembly removed form the FIG. 1 water filtration device;

FIG. 7 depicts a midsectional view of the end of life indicator assembly taken along line 5'—5' of FIG. 5;

DETAILED DESCRIPTION OF THE PREFERRED EMBODIMENT

A Generalized Discussion of the Overall Water Filtration Device

Figure 1:
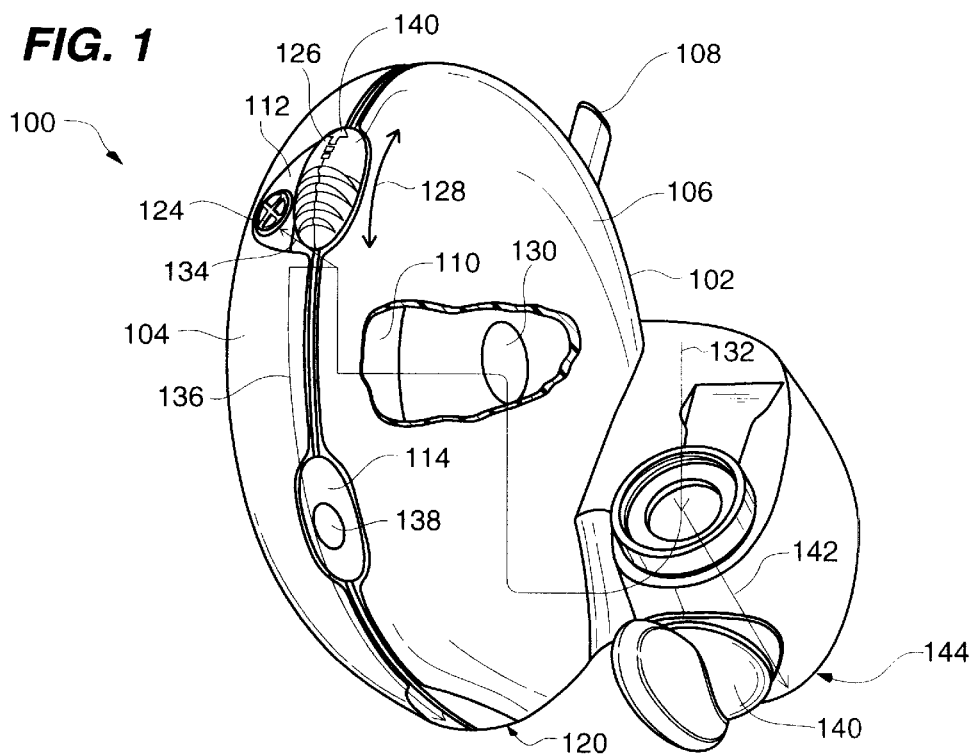
FIG. 1 depicts a top right front elevational perspective view of a water filtration device having a water fountain and flow indicator according to the present invention.

FIG. 1 depicts a water filtration device 100 according to the present invention. Water filtration device 100 includes a housing 102 having a left concavo-convex shell 104 and a right concavo-convex shell 106, which are held in bivalve mating engagement by bayonet latch mechanism 108. The mating of concavo-convex shells 104 and 106 provides an internal cavity where a suitable filter, e.g., a cylindrical activated carbon filter 110 (shown with a portion of shell 106 removed for purposes of illustration) is operably retained. Concavo-convex shell 104 is bonded to a water fountain assembly 112 including a flow indicator assembly 114. A thread-on connector 116 provides a means for thread-on coupling of filtration device 100 with a conventional water faucet outlet. Inlet 118 of connector 116 is the first part of a flow pathway leading into water filtration device 100, through the internal filter 1 10, and exiting first outlet 120.

Figure 2:
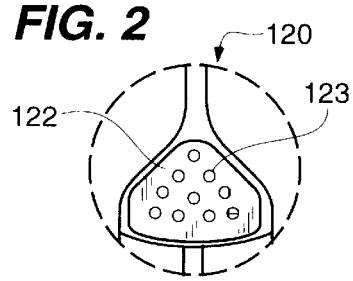
FIG. 2 depicts a flow outlet in the FIG. 1 water filtration device.

FIG. 2 shows a bottom perspective view of first outlet 120 including a central aerator 122 and a plurality of spray openings 123. Water fountain assembly 112 includes a second outlet 124 and a selectively operable gate valve 126. The internal flow configuration of water filtration device 100 is such that water may be made to flow from one of first outlet 120 or second outlet 124 by selective actuation of gate valve 126 along the track indicated by double headed arrow 128.

An end of life indicator assembly 130 is found at the center of cylindrical filtration cartridge 1 10. In operation, water travels through water filtration device 100 along flow pathway 132. In FIG. 1, flow pathway 132 is drawn atop water filtration device 100 for purposes of illustration, but schematically represents structure defining an internal flow pathway. Any internal arrangement of conduits may be used to build flow pathway 132, which begins in an upstream position at inlet 118 and travels in a radially inward direction through filter 110 to end of life indicator assembly 130, which provides the outlet side of filter 110 where the water is collected and delivered to water fountain assembly 112. Flow pathway 132 forms two branches within water fountain assembly 112. Branch 134 leads to second outlet 124. Branch 136 leads to flow indicator assembly 114 and first outlet 120.

A user desiring to use filtration device 100 need only couple connector 116 with the end opening of any standard household faucet (not depicted). A conventional female to male swedge may be necessary to establish this connection if the household faucet has a female end. The user then opens a conventional cold water or hot water valve on the faucet to cause flow along flow pathway 132 and flow segment 136 through flow indicator assembly 114 and first outlet 120. The user observes the spinning of paddlewheel 138 responsive to the movement of water along flow segment 136, which provides assurance that leaks internal to water filtration device 120 have not bypassed filter 110. The user actuates gate valve 126 in sliding motion along the direction of arrow 140 to shut off flow along branch 136 and activate flow along branch 136, which is used as a drinking fountain. A bypass valve 140 may be actuated to prevent flow to filter 110 and activate flow along branch 142 for discharge at a third outlet 144.

Positioning of the End of Life Indicator Assembly

Figure 3:
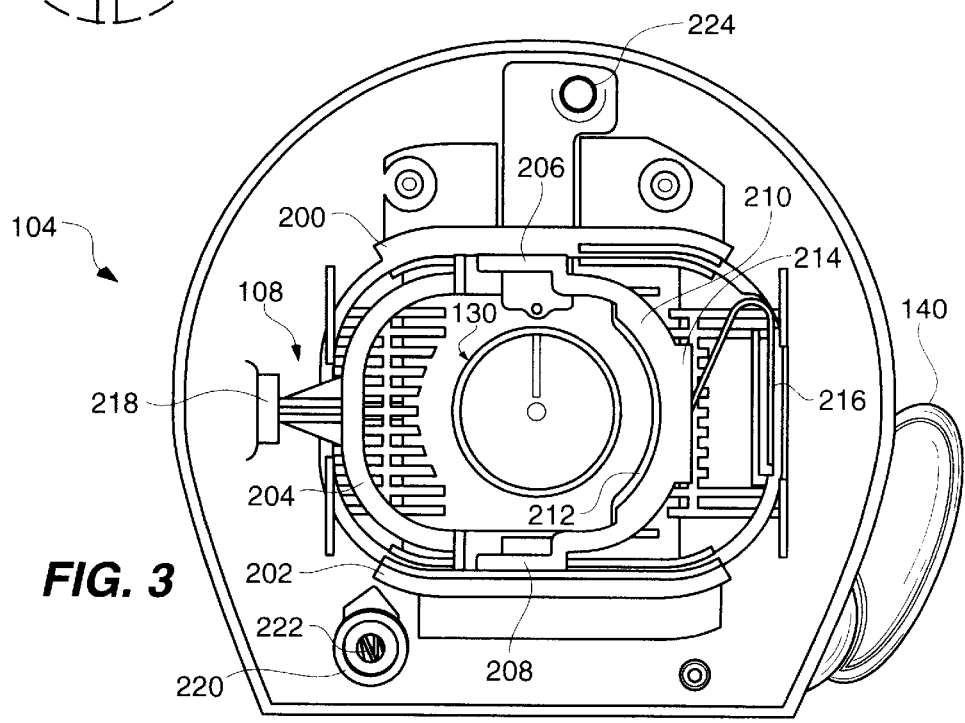
FIG. 3 depicts an interior right side elevational view of a concavo-convex shell removed from the FIG. 1 water filtration device.

FIG. 3 depicts concavo-convex shell 104 separated from the other components of water filtration device 100 that are shown in FIG. 1. End of life indicator assembly 130 is centrally positioned with respect to bayonet latch mechanism 108. Bayonet latch mechanism 108 includes guide tracks 200 and 202, which retain and permit longitudinal sliding motion of a symmetrical ring-like latch portion 204. Latch portion 204 has a pair of opposed L-shaped abutments 206 and 208 leading to a rounded end segment 210. End segment 210 includes an arcuate inboard bevel 212 and a flattened outboard segment 214. Leaf spring 216 biases outboard segment 210 towards button 218.

A raised cylindrical inlet conduit 220 presents a female recess 222 leading to inlet 118 (see FIG. 1). An outlet conduit 224 receives water from end of life indicator assembly 130 for transport to water fountain assembly 112 (see FIG. 1).

Figure 4:
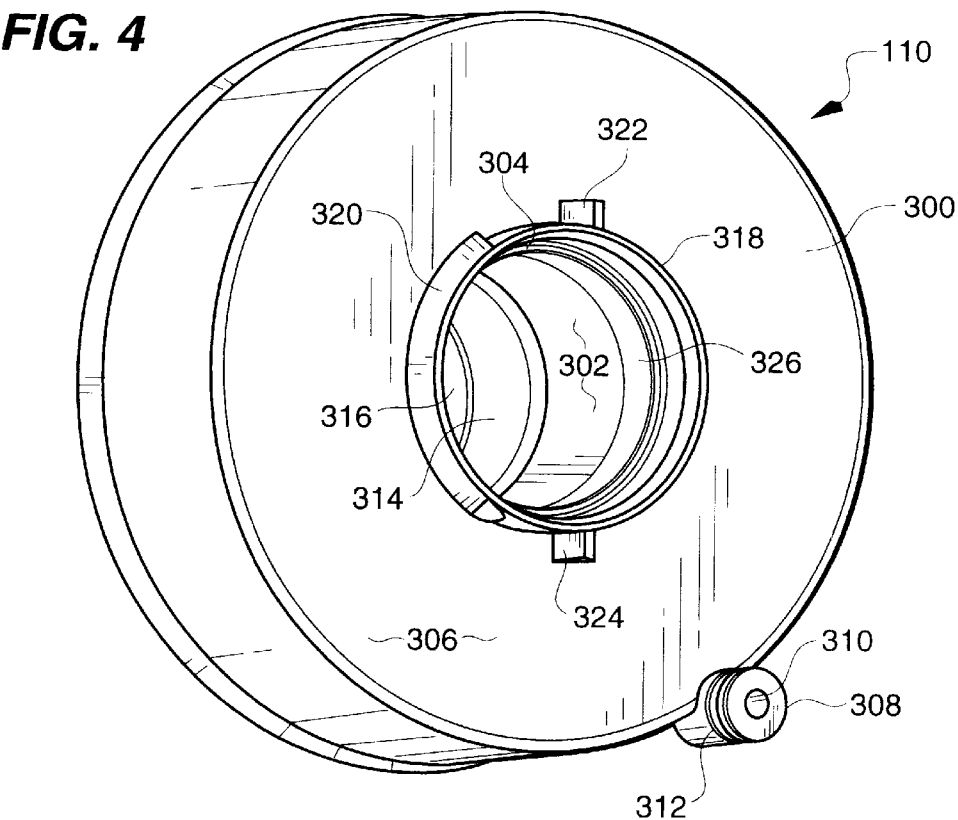
FIG. 4 depicts an interior front right side perspective view of a filtration cartridge removed from the FIG. 1 water filtration device.

FIG. 4 depicts filtration cartridge 110 as it appears when removed from the complete device shown in FIG. 1. Filtration cartridge 110 includes a cylindrical outer shell 300 substantially enclosing a resin-bound permeable bed 302 of activated carbon, which is exposed through central orifice 304 in circular end wall 306. A cylindrical male cartridge inlet 308 has a central inlet orifice 310 leading to activated carbon bed 302, and an O-ring seal 312. The dimensions of male cartridge inlet 308 are sufficient to provide a water tight seal when male cartridge inlet 308 is received in mating engagement within female recess 222. Central orifice 304 leads to interior cavity 314 where end of life indicator assembly 130 (see FIG. 1) resides in the complete water filtration device 100. A transparent window 316 forms a portion of the far wall of interior cavity 314.

A raised cylindrical wall 318 circumscribes central orifice 304. Raised cylindrical wall 318 includes an arcuate triangular nib 320, as well as a pair of ears 322 and 324. Cylindrical wall 318 holds arcuate triangular nib 320 away from end wall 306 a sufficient distance to permit sliding of arcuate inboard bevel 212 (see FIG. 3) between arcuate triangular nib 320 and end wall 306. Cylindrical wall 318 also holds arcuate ears 322 and 324 away from end wall 306 a sufficient distance to permit sliding of arcuate L-shaped abutments 206 and 208 (see FIG. 3) between end wall 306 and ears 322 and 324.

Figure 5:
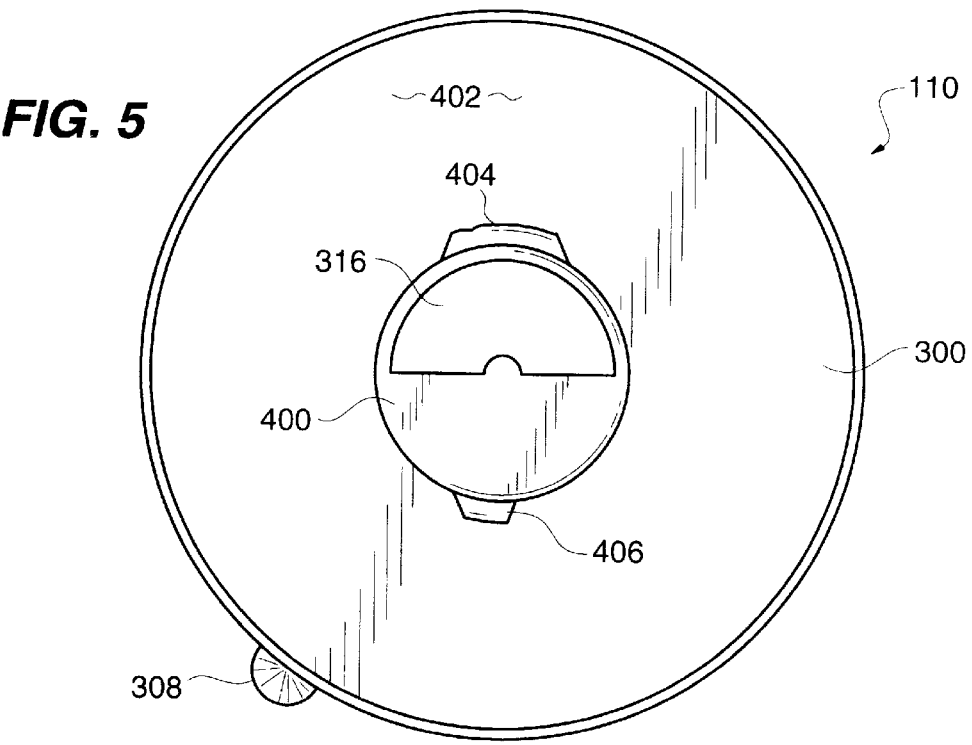
FIG. 5 depicts a left side elevational view of the FIG. 3 filtration cartridge.

FIG. 5 depicts a central raised cylindrical boss 400, which is formed in far wall 402 of filtration cartridge 110. Raised cylindrical boss 400 includes transparent window 316, as well as outboard protrusions 404 and 406. Outboard protrusions engage corresponding interlocking retaining structure (not depicted) on the interior of concavo-convex shell 106, and serve to hold concavo-convex shell 106 in place on the complete water filtration device 100 (see FIG. 1).

The Construction of End of Life Indicator Assembly 130

FIG. 6 depicts a top right front elevational perspective view of end of life indicator assembly 130. End of life indicator assembly 130 includes a rounded cylindrical base 502, an outer cylindrical wall 504 bonded to base 500 and a round indicator face 504 positioned within outer cylindrical wall 504. Base 504 includes a slot 506 and radially outboard shoulder 508, which permit alignment of base 504 with corresponding structure on concavo-convex shell 104 when end of life indicator assembly 130 is installed to the position shown in FIG. 3. Outer cylindrical wall 502 includes inlet hole 510, which receives water from activated carbon bed 302 (see FIG. 4). Indicator face 504 provides a convex surface 512 having a central raised nose 514 and an indicator position bar 516. Indicator face 504 is rotatable with respect to outer cylindrical wall 502.

FIG. 7 depicts a midsectional view of end of life indicator assembly 130 taken along line 5'—5' of FIG. 6. The major components of end of life indicator assembly 130 include a flow totalization mechanism 600, a reset mechanism 602, and a flow restrictor assembly 604.

Figure 8:
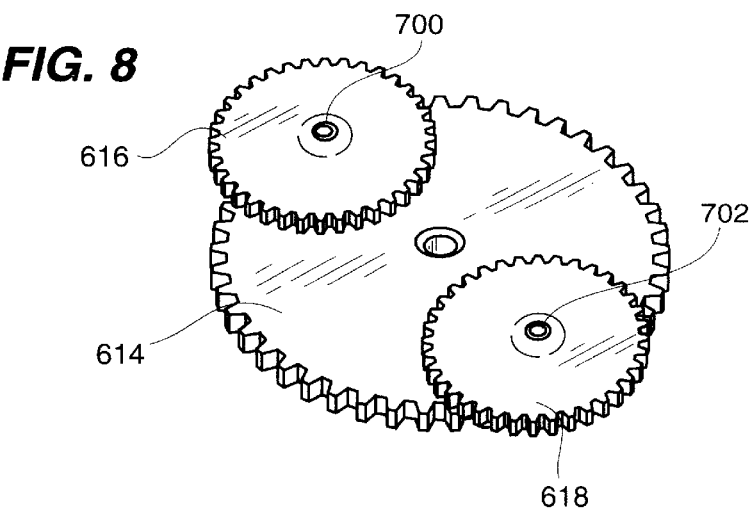
FIG. 8 depicts a pair of planet gears operably coupled with a sun gear for use in the FIG. 6 end of life indicator.

Flow totalization mechanism 600 includes a planetary gearing system 606, which provides a 3,000,000:1 gear reduction ratio from a paddlewheel positive displacement wheel 608 to a ratchet 610, which engages indicator face 504. Planetary gear reduction system includes a plurality of sun gears, e.g., sun gears 612 and 614 on which are mounted smaller planet gears, e.g., planet gears 616 and 618. The inner surface 620 of outer cylindrical wall 502 has teeth that operate as a ring gear which meshes with the planet gears 616 and 618. FIG. 8 provides additional detail with respect to planetary gear reduction system 600 by showing planetary gears 616 and 618 pinned on corresponding spindles 700 and 702 of sun gear 614.

Paddlewheel positive displacement meter 608 includes a plurality of blades, e.g., blade 624, which catch water flowing from inlet hole 510 (see FIG. 6) into paddlewheel chamber 626. The resultant rotation of paddlewheel positive displacement meter 608 around central rod 622 induces a corresponding rotation with gear reduction through planetary gear reduction system 600 all the way to ratchet 610. An end gear 628 is added to stabilize the assembly.

Figure 9:
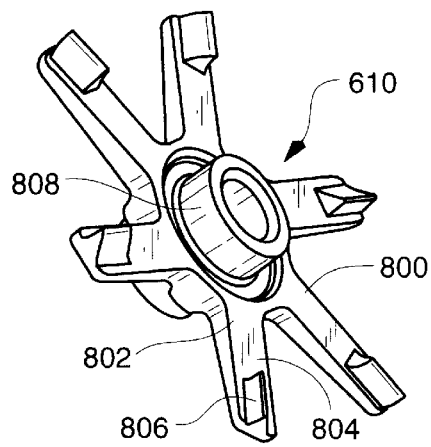
FIG. 9 depicts a ratchet for use in the FIG. 6 end of life indicator.

FIG. 9 provides additional detail with respect to ratchet 610. Ratchet 610 includes a plurality of arms, e.g., arms 800 and 802. Each arm includes a spoke 804 having a ratchet tooth 806. A smooth raised cylindrical slip collar 808 is centrally positioned on ratchet 610.

Figure 10:
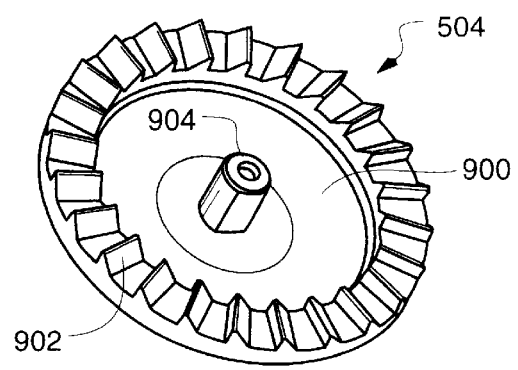
FIG. 10 depicts an indicator face for use in the FIG. 6 end of life indicator.

As shown in FIG. 7, the teeth 806 of ratchet 610 engage indicator face 504. FIG. 10 provides additional detail with respect to the manner of engagement between ratchet 610 and indicator face 504. A convex interior surface 900 of indicator face 504 has a plurality of indicator face teeth 902 at the outer radius of indicator face 504. These indicator face teeth 902 engage corresponding teeth 806 of ratchet 610 (see FIG. 7) to require rotation of indicator face 504 concomitant with rotation of ratchet 610. A central slip collar 904 has a diameter sufficient to fit within cylindrical slip collar 808 of ratchet 610.

While sun gears 612 and 614 and paddlewheel positive displacement meter are freely rotatable with respect to central rod 622, indicator face 504 is press fit over end 628 or central rod 622. Thus, rotation of indicator face 504 causes a corresponding rotation of central rod 622.

Reset mechanism 602 includes a torsion block 630, which is press fit over end 632 of central rod 622. Thus, rotation of indicator face 504 and rod 622 causes a corresponding rotation of torsion block 630. A torsion spring 634 is pinned into torsion block 630 at slot and pinned into base 500 at slot. Rotation of torsion block, accordingly, builds torque within torsion spring 634. A portion 640 of central rod 640 within base 500 is free to move within hole 642.

Reset mechanism 602 also includes compression spring, which is concentrically mounted with respect to central slip collar 904 for compression against concave face 900 of indicator face 504 (see FIG. 10) and ratchet 610.

Figure 11:
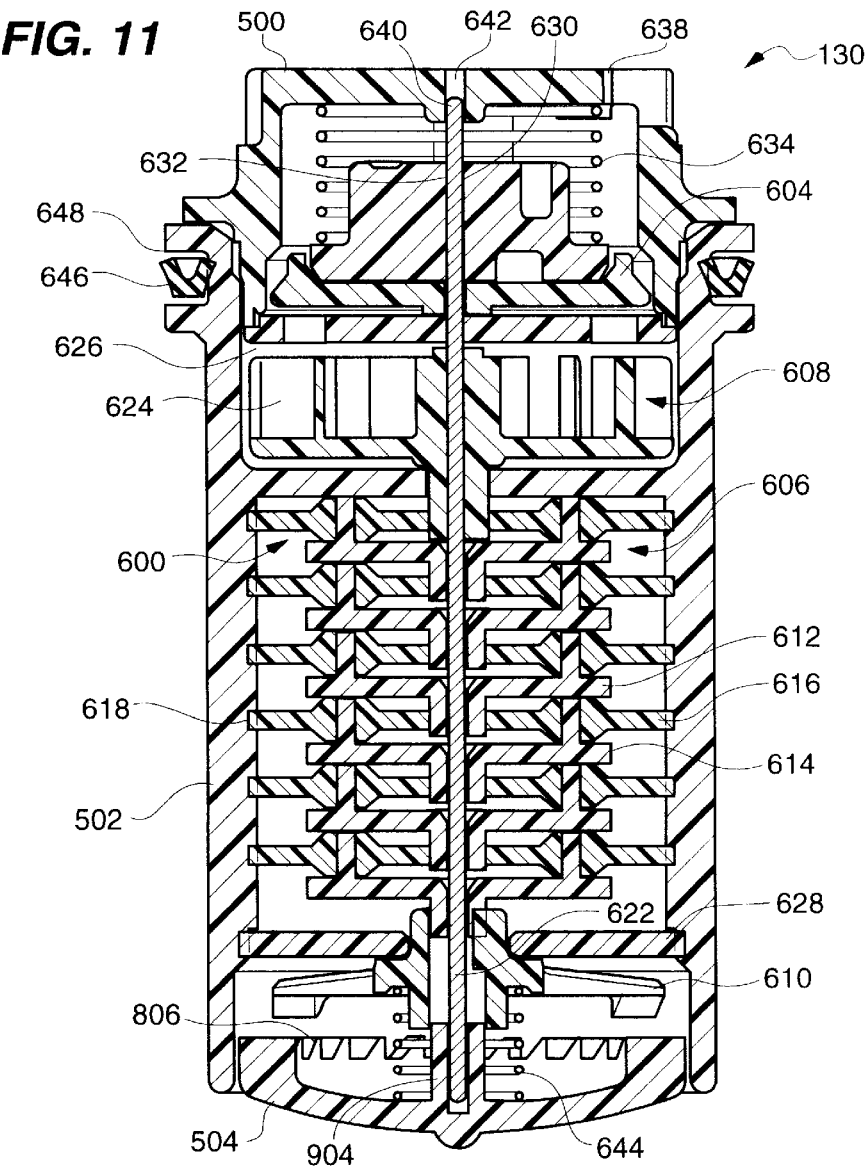
FIG. 11 depicts a midsectional view like that of FIG. 7, but showing the indicator face of FIG. 10 disengaged from the ratchet of FIG. 9.

Raised nose 514 of indicator face 504 normally abuts the interior surface of transparent window 316 (see FIG. 5) with sufficient compressive force to overcome the bias of compression spring 644. This force seats the indicator face teeth 904 firmly against the ratchet teeth 806 for rotation of indicator face 504 concomitant with rotation of ratchet 610. When filtration cartridge 110 (see FIG. 1) is removed from the assembled water filtration device 110, transparent window 316 disengages from nose 514. Compression spring 644 then slides indicator face 504 and central rod 622 outwardly to the position shown in FIG. 11 with torsion block 630 contacting a perforated abutment wall 646 of base 500. In FIG. 11, indicator face teeth 902 have disengaged from ratchet teeth 806. Torque from torsion spring 634 rotates torsion block 634 which, in turn, rotates indicator face 504 to a zero totalization setting through rotation of central rod 622. The reset is completed when a new filtration cartridge is placed over end of life indicator assembly 130 with transparent window 316 (see FIG. 5) of filtration cartridge 110 abutting nose 514 to reengage indicator face teeth 902 with ratchet teeth 806.

As shown in FIGS. 7 and 11, O-ring seal is held in slot 648 of outer cylindrical wall 504. O-ring seal 646 provides a watertight seal against inboard sleeve 326 (see FIG. 4).

Figure 12:
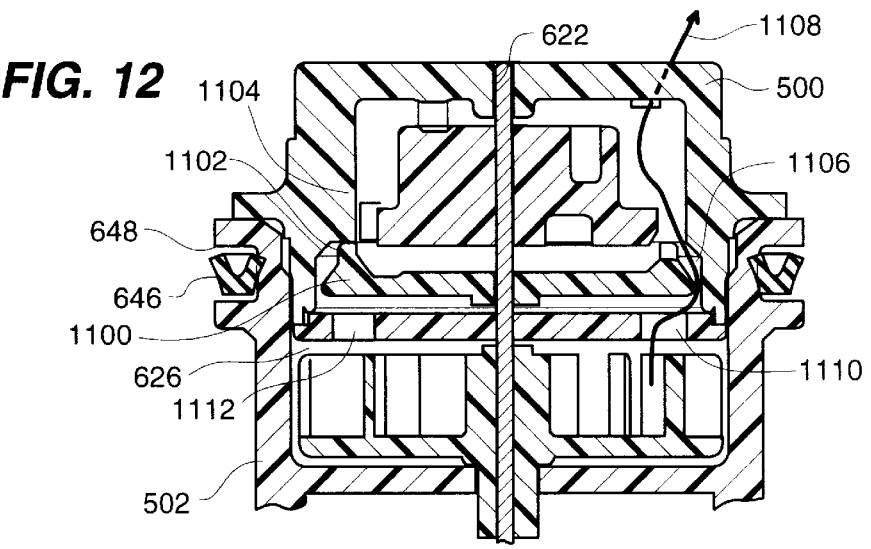
FIG. 12 depicts a midsectional view like that of FIG. 7, but showing a circular restrictor element riding up over a base pin to provide a via of relatively large surface area permitting the flow of water at a correspondingly high rate.

FIG. 12 is a midsectional view like that of FIG. 7, but showing additional detail with respect to flow restrictor assembly 604. A circular restrictor element 1100 is press-fit over central rod 622. Circular restrictor element 1100 has a raised cylindrical rim 1102 riding atop a base pin 1104 to provide a via 1106 of relatively large surface area across the radially outboard perimeter of circular restrictor element 1100. Accordingly, water 1108 is able to flow through perforations 1110 and 1112 and through via 1106 at a relatively high rate.

Figure 13:
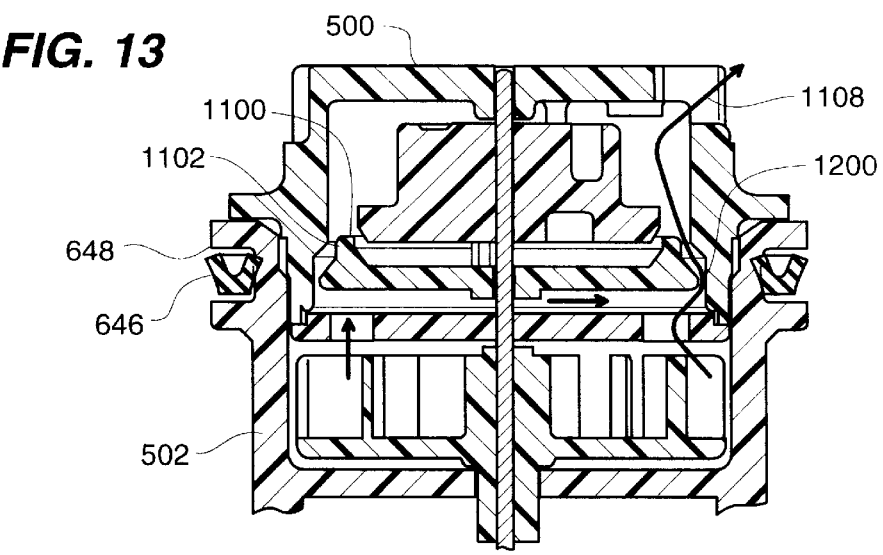
FIG. 13 depicts a midsectional view like that of FIG. 12, but showing the circular restrictor element having fallen off of the base pin to provide a via of relatively smaller large surface area permitting the flow of water at a correspondingly low rate.

FIG. 13 is a midsectional view like that of FIG. 12, but showing yet more detail with respect to flow restrictor assembly 604. In FIG. 13, circular restrictor element 1100 is no longer riding on base pin 1104 (see FIG. 12). Thus, circular restrictor element 1100 has fallen under the pressure of water 1108 to provide a new via 1200 of reduced surface area with respect to via 1106 of FIG. 12. The reduced surface area acts as a choke to cut back the rate of flow in water 1108. The flow rate is preferably reduced to a value ranging from five to fifty percent of the rate corresponding to that obtainable from the configuration of FIG. 12, and is more preferably reduced to a value ranging from ten to forty percent of the rate corresponding to that obtainable from the configuration of FIG. 12.

Figure 14:
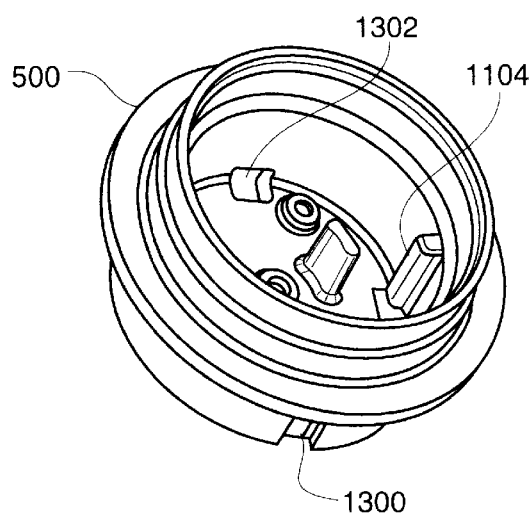
FIG. 14 depicts additional detail with respect to a base element shown in FIGS. 12 and 13.
Figure 15:
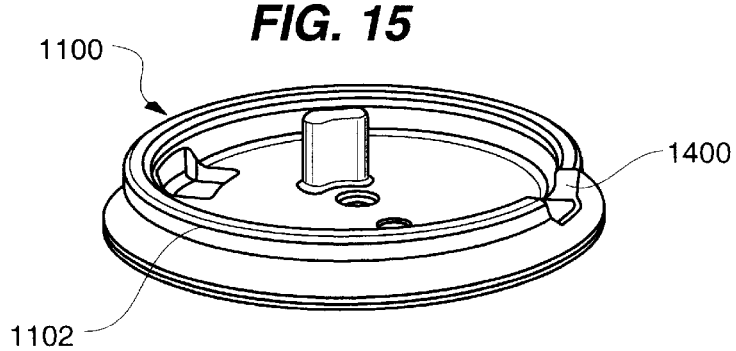
FIG. 15 depicts additional detail with respect to the circular restrictor element shown in FIGS. 12 and 13.

FIG. 14 depicts a top, side perspective view of base 500 revealing base pin 1104, as well as water exit ports 1300 and 1302. Water exiting water exit ports 1300 and 1302 travels into outlet conduit 224 (see FIG. 3) towards flowpath branches 134 and 136 (see FIG. 1). FIG. 15 depicts a bottom perspective view of circular restrictor element 1100 showing raised cylindrical rim 1102 including a slot 1400. The dimensions of slot 1400 are sufficient to slide down over base pin 1104 when the rotation of raised cylindrical rim 1102 atop base pin 1104 (see FIG. 12) brings slot 1400 into alignment with base pin 1104.

Those skilled in the art will understand that the preferred embodiments described above may be subjected to apparent modifications without departing from the true scope and spirit of the invention. The inventors, accordingly, hereby state their intention to rely upon the Doctrine of Equivalents, in order to protect their full rights in the invention.

We claim:

1. A water treatment device comprising:
    a housing including
        means for mounting said housing on a water faucet,
        an inlet,
        an outlet, and
        structure defining a flow pathway internal to said housing, said flow pathway connecting said inlet with said outlet, said flow pathway containing
        a cartridge providing means for treating water flowing through said flow pathway and said cartridge, said cartridge containing sufficient treatment material to treat a predetermined amount of water;
    means for totalizing a quantity of water treated by said cartridge and for providing a visual indication of said quantity of water,
    means responsive to mechanical action from said totalizing means for restricting said flow pathway to reduce a first rate of waterflow through said pathway to a second rate ranging from five to fifty percent of said first rate when said predetermined amount of water equals said quantity of water, and
    a central rod supporting said water totalization means, said visual indication means, and said restricting means.

2. The water treatment device of claim 1 including means for resetting said totalization means to zero and opening said restricting means responsive to replacement of said cartridge.

3. The water treatment device of claim 2 wherein said water totalizing means includes an indicator face, said cartridge includes an indicator window, and said resetting means includes a spring biasing said indicator face towards said window.

4. The water treatment device of claim 3 wherein said indicator face includes a plurality of teeth, and said water totalizing means includes means for engaging said plurality of teeth when said indicator face is biased towards said window and for disengaging said plurality of teeth when said indicator face is not biased towards said window.

5. The water treatment device of claim 4 wherein said teeth engaging and disengaging means includes a ratchet.

6. The water treatment device of claim 3 wherein said resetting means includes a torsion spring operably coupled with said indicator face.

7. The water treatment device of claim 1 wherein said said means for totalizing a quantity of water includes a planetary gear reduction system having;
    a plurality of coaxially stacked sun gears having a common axis through said rod;
    a plurality of planet gears having rotational axes parallel to said common axis of said plurality of sun gears; and
    a rotatable positive displacement wheel having an axis of rotation parallel to said common axis of said sun gears.

8. The water treatment device of claim 7 wherein said positive displacement wheel is a paddlewheel.

9. The water treatment device as set forth in claim 7 wherein said restricting means includes a rotatable disk operably coupled with said totalizing means for coaxial rotation with said sun gears.

10. The water treatment device a of claim 9 wherein said flow pathway includes an annular space around an outer margin of said rotatable disk, said annular space having an area, and said restricting means includes means for reducing said area by rotation of said disk.

\* \* \* \* \*